Sept. 29, 1931.  D. E. COPPLE  1,825,180
APPARATUS FOR FORMING SPOKE HOLES IN RIM MEMBERS OF VEHICLE WHEELS
Filed June 13, 1929  3 Sheets-Sheet 1
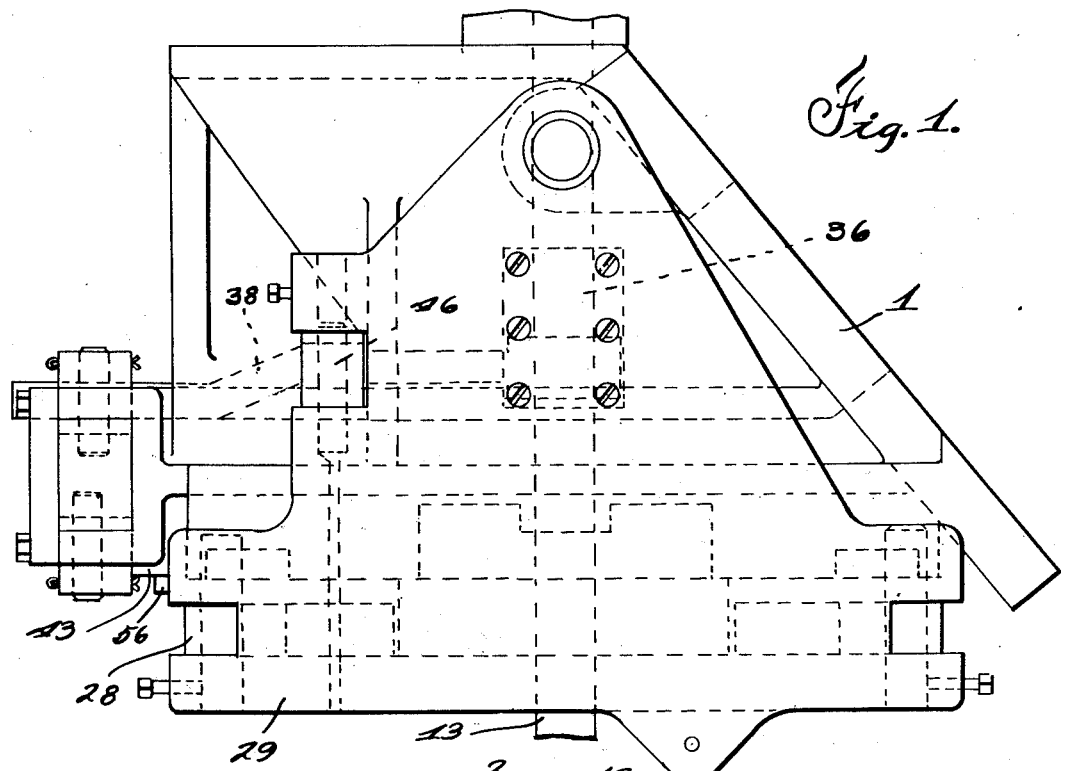
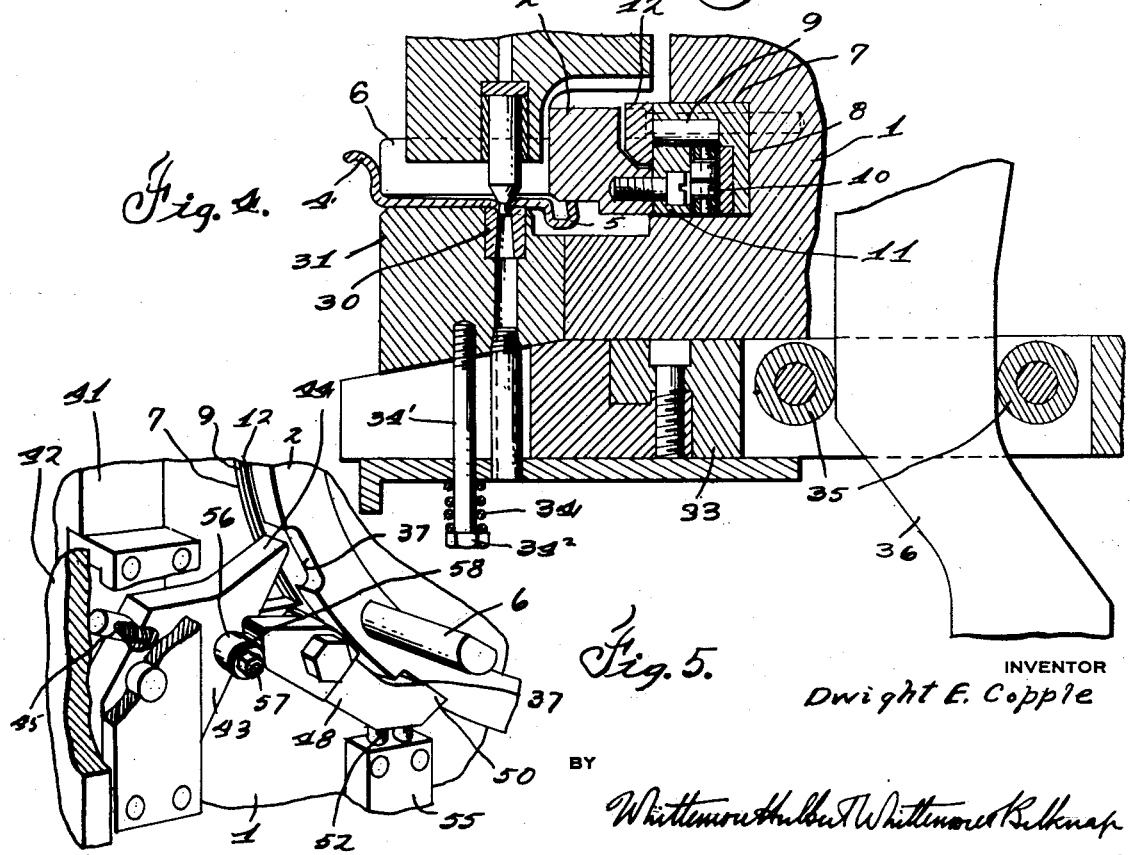
INVENTOR
Dwight E. Copple
BY
ATTORNEYS

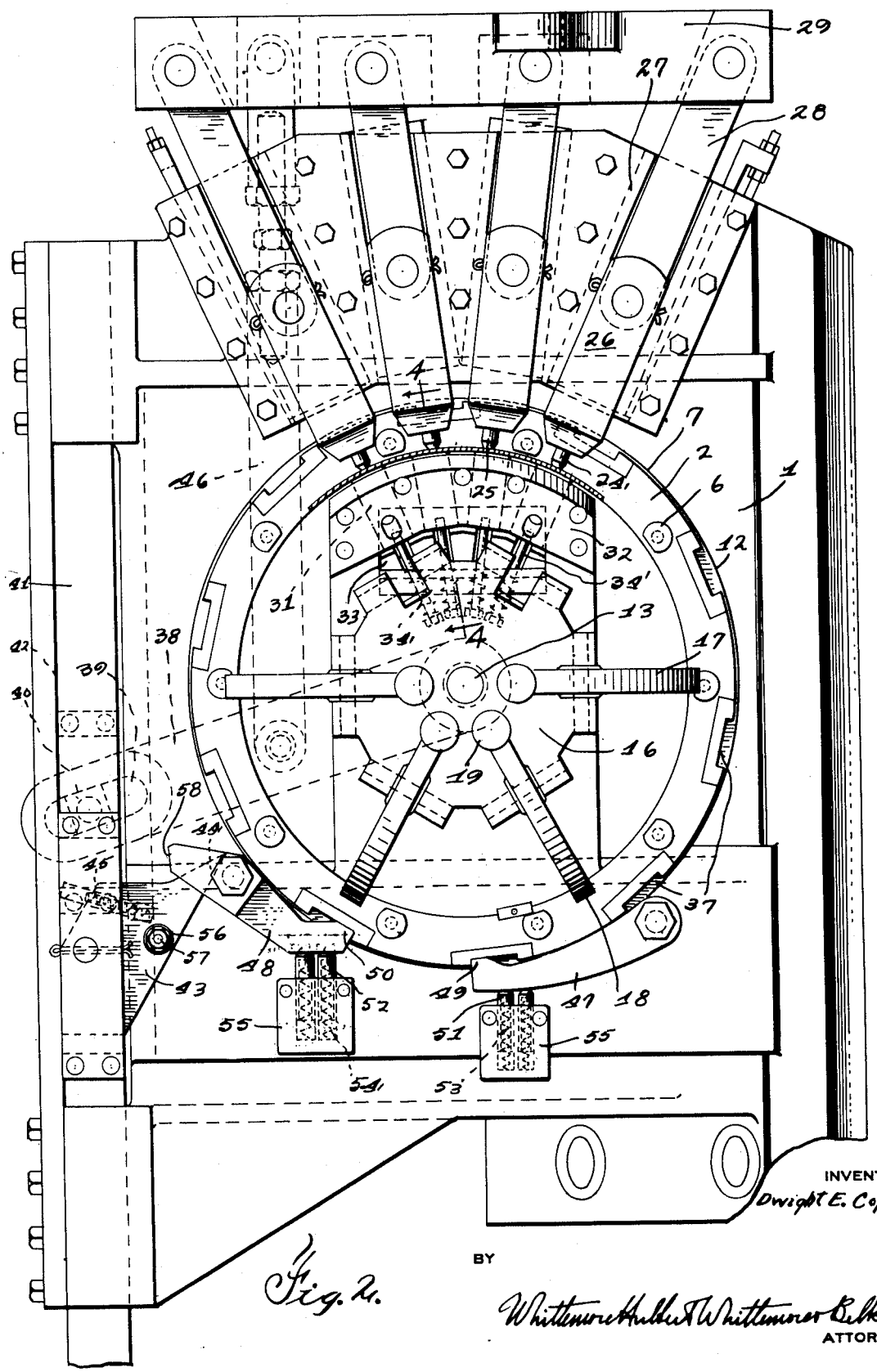

Patented Sept. 29, 1931

1,825,180

UNITED STATES PATENT OFFICE

DWIGHT E. COPPLE, OF DETROIT, MICHIGAN, ASSIGNOR TO KELSEY-HAYES WHEEL CORPORATION, OF DETROIT, MICHIGAN, A CORPORATION OF NEW YORK

APPARATUS FOR FORMING SPOKE HOLES IN RIM MEMBERS OF VEHICLE WHEELS

Application filed June 13, 1929. Serial No. 370,598.

The invention relates to an apparatus for forming holes in annular members and refers more particularly to an apparatus for forming spoke holes in vehicle wheel rim members. One of the objects of the invention is to so construct the apparatus that it will form a plurality of spoke holes in a rim member at one time. Another object is to so construct the apparatus that it will automatically index and accurately locate the rim member in its various positions of adjustment. With these as well as other objects in view, the invention resides in the novel features of construction and combinations and arrangements of parts as more fully hereinafter set forth.

In the drawings:

Figure 1 is a plan view, partly broken away, of an apparatus embodying my invention;

Figure 2 is a front elevation thereof, partly broken away, and showing in section a portion of a vehicle wheel rim member;

Figure 4 is an enlarged cross section on the line 4—4 of Figure 2;

Figure 5 is a perspective view of a portion of Figure 2.

Figure 3:
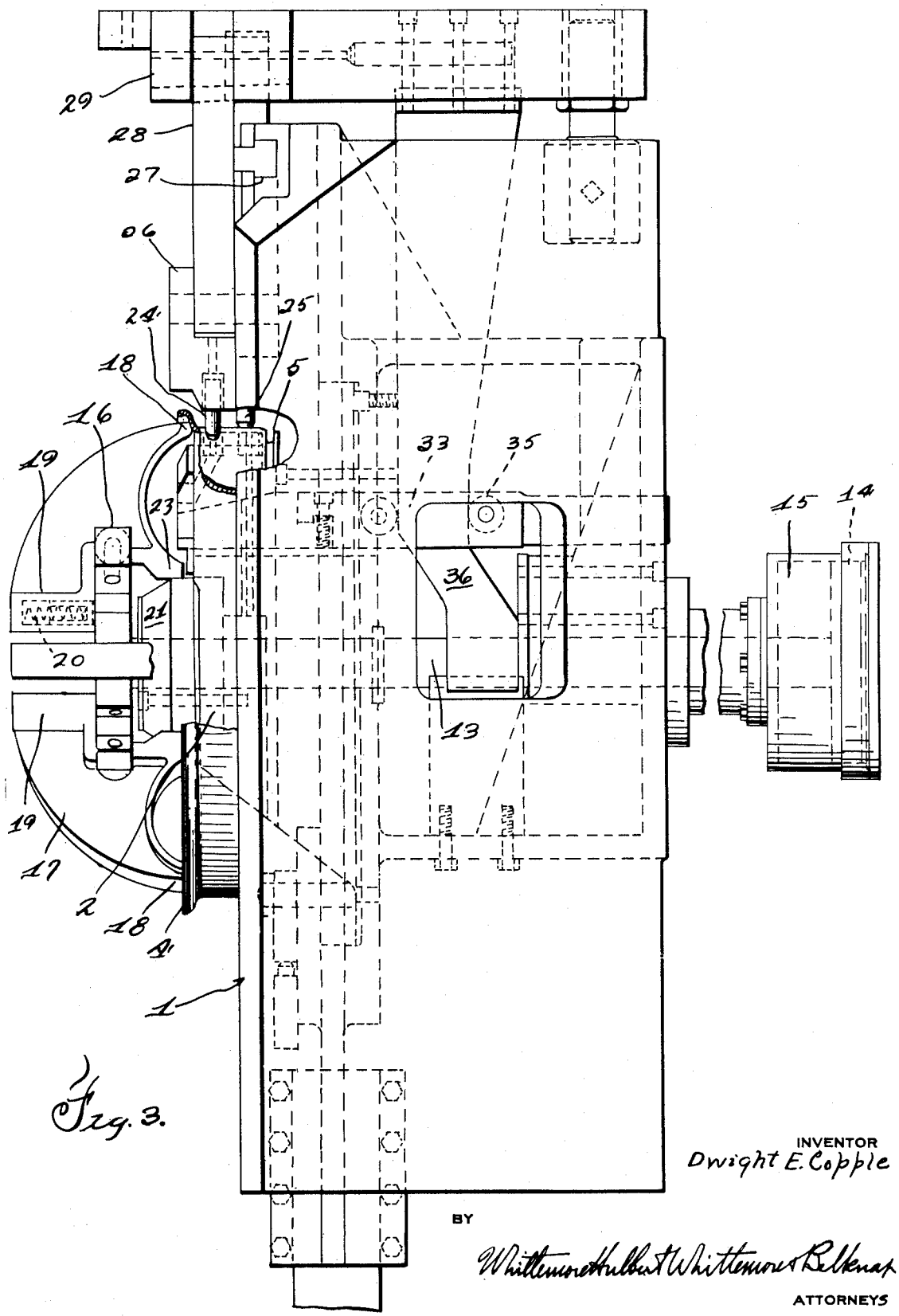
Figure 3 is an end elevation, partly broken away.

1 is the base of the apparatus and 2 is the annular carrier for the vehicle wheel rim member which in the present instance is of the solid base type having the integral outwardly extending back flange 4 and the integral inwardly located portion 5 at its front edge forming an annular groove for receiving a suitable ring, which will cooperate with the back flange to retain the tire. The carrier has the annular series of transverse pins 6, which are adapted to extend over the base of the rim member into engagement with the front side of the back flange. The base 1 has in its front side the annular groove 7 in which is located the annular L-shaped ring 8 forming a race for the annular series of rolls 9 and 10 extending transversely of each other and engaging the supporting ring 11 of the carrier. This supporting ring is held in place by means of the retaining ring 12, which overlies the supporting ring and is fixedly secured to the base.

For clamping the rim member to the carrier, I have provided the shaft 13 which extends transversely of and is journaled in the base 1 concentric with the carrier. The rear end of this shaft is connected to the piston 14 slidable within the cylinder 15, the latter being rigidly secured to the rear side of the base and being ported to receive and exhaust fluid under pressure, such as compressed air, for forcing the piston in either direction. The shaft has fixedly secured to its front end the plate 16, to the periphery of which the clamping members 17 are pivotally secured. These clamping members might be said to be segments and they extend radially from the plate and provide shoulders or abutments 18 for engaging the rear side of the back flange 4 of the rim member. These clamping members are formed with the bosses 19 overlying the plate 16 and containing the coil springs 20 which are adapted to exert pressure upon the plate to resiliently force the clamping members in a clockwise direction about their pivots. There is also the annular cam or wedge 21 which is fixedly secured to the front side of the base 1 concentric with the shaft 13, this shaft extending through the cam or wedge member. The clamping members have the inner portions 23 which are adapted to engage this cam or wedge member. The arrangement is such that with the parts in position, as shown in Figure 3, the cam or wedge member 21 engaging the inner portions 23 of the clamping members 17 hold these clamping members outwardly so that their abutments or shoulders 18 engage the back flange 4 of the rim member, thereby clamping the rim member to the carrier 2. Upon forward movement of the shaft 13 and its plate 16, the clamping members are also carried forward and their inner portions 23 will ride upon the inclined portion of the cam or wedge member by reason of the effort exerted by the coil springs 20, thereby clearing the inner surface of the rim member so that the same may be readily removed and replaced by another rim member. Upon movement of the shaft in the opposite or rearward direction it will be seen that the clamping members will first be swung in a counter clockwise direction about their pivots by the cam or wedge member and then held in position to engage the back flange of the rim member and firmly clamp the same to the carrier.

To form the holes in the rim member 3 for receiving wire spokes I have in general provided reciprocable punches and also reciprocable dies for cooperating with the punches while operating upon the rim member. As shown, 24 and 25 are punches secured to the holders 26 which slidably engage the guideways 27 upon the base 1. The guideways and holders are so arranged that the punches upon reciprocation of the holders are movable axially of the rim member 3. The holders are pivotally connected to the lower ends of the links 28, the upper ends of which are pivotally connected to the plate 29, which latter is fixedly secured to the cam and may be said to form a part thereof. This plate is vertically reciprocable. 30 are dies adapted to cooperate with the punches 24 and 25. These dies are fixedly secured to the holders 31, which slidably engage the guideways 32 upon the base 1, both the guideways and holders being so arranged that the dies are radially movable relative to the rim member. For reciprocating the die holders, I have provided the transverse actuating member 33 having at its front end spaced noses with inclined upper faces which slidably engage the lower faces of the die blocks. These die blocks are resiliently held against the noses by means of the coil springs 34 encircling the studs 34' secured to the die blocks, these coil springs abutting the shoulders 34² upon the studs and a suitable part upon the base. The actuating member is located above the shaft 13 and is movable parallel thereto, it having the spaced transverse anti-friction rolls 35 between which extend the cam member 36, which latter is fixedly secured at its upper end to the plate 29. The cam surfaces upon this cam member are so shaped and positioned that upon downward movement of the plate the actuating member is moved forwardly to move the dies radially outward into engagement with the rim member prior to engagement of the punches with the rim member.

For automatically indexing the rim member, I have provided in the periphery of the carrier 2 the series of angularly spaced notches 37. There is also the arm 38 which is pivotally mounted at its inner end upon the shaft 13. The outer end of this arm is formed with the elongated opening 39 for slidably receiving the block 40, which is pivotally connected to the slide 41. This slide vertically slidably engages the guideway 42 and has pivotally connected to its lower end the dog 43. This dog has the nose 44 which is adapted to engage successive notches 37, the nose being yieldably held in position to engage the notches by means of the coil spring 45 between the dog and the slide. 46 is an adjustable link connection pivotally connected at its upper end to the plate 29 and at its lower end to the arm 38 intermediate its ends, the arrangement being such that during the upward movement of the plate and after the movement of the punches and dies away from the rim member the arm will be swung upwardly to thereby raise the dog, which first engages a notch 37 and upon continued upward movement rotates the carrier and the rim member to its next position.

For holding the carrier and its rim member in adjusted position, I have provided the pawls 47 and 48, which are pivotally mounted upon the base 1 and extend toward each other and are provided with the noses 49 and 50 for respectively engaging the front and rear shoulders of adjacent notches 37. These pawls are yieldably held in position to engage the notches by means of the plungers 51 and 52, respectively, which are resiliently forced against the pawls by means of the coil springs 53 and 54, respectively, within the housings 55 upon the base 1. The pawl 47 permits rotation of the carrier and its rim member in a clockwise direction for indexing, but prevents rotation thereof in a counter clockwise direction while the pawl 48 normally prevents rotation of the carrier and its rim member in a clockwise direction, but permits rotation thereof in a counter clockwise direction. To release the pawl 48 to permit indexing, I have provided the roll 56 which is journaled upon the pin 57. This pin is secured to and extends transversely of the dog 43 and occupies a position such that prior to engagement of the nose 44 of the dog in a notch 37 of the carrier the roll 56 engages the rear end 58 of the pawl 48 and swings its nose 50 out of the notch engaged thereby and holds the pawl 48 in its released position until the carrier and its rim member have been moved in a clockwise direction by the dog sufficiently far to prevent the nose 50 from engaging the notch from which it had just been moved.

What I claim as my invention is:

1. The combination with a carrier for annular work, of a reciprocable member movable transversely of said carrier, and means for clamping the annular work to said carrier, including pivotal members upon said reciprocable member adapted in one position of said reciprocable member to engage the annular work and in another position of said reciprocable member to clear the inner surface of the annular work.

2. The combination with a carrier for annular work, of a reciprocable member movable transversely of said carrier, means for clamping the annular work to said carrier, including pivotal members upon said reciprocable member adapted in one position of said reciprocable member to engage the annular work and in another position of said reciprocable member to clear the inner surface of the annular work, and a stationary cam engageable with said pivotal members upon movement of said reciprocable member in one direction to swing said pivotal members.

3. The combination with a carrier for annular work, of a reciprocable member movable transversely of said carrier, means for clamping the annular work to said carrier including members pivotally mounted upon said reciprocable member, yieldable means between said reciprocable member and pivotal members for swinging the latter in one direction, and cam means engageable with said pivotal members to swing the same in the opposite direction.

4. The combination with a base and a carrier for annular work on said base, of a longitudinally reciprocable shaft on said base movable transversely of said carrier, a stationary cam on said base substantially concentric with said shaft, and pivotal work clamping members connected to said shaft and adapted to engage said cam to be moved into clamping engagement with the work.

In testimony whereof I affix my signature.

DWIGHT E. COPPLE.